United States Patent [19]

Beusse

[11] 4,409,658
[45] Oct. 11, 1983

[54] APPARATUS FOR LANDING LOADS FROM TRANSPORT AIRCRAFT, ESPECIALLY LOW FLYING AIRCRAFT

[75] Inventor: Hans Beusse, Hamburg, Fed. Rep. of Germany

[73] Assignee: Messerschmitt-Boelkow-Blohm Gesellschaft mit beschraenkter Haftung, Munich, Fed. Rep. of Germany

[21] Appl. No.: 52,426

[22] Filed: Jun. 26, 1979

Related U.S. Application Data

[63] Continuation-in-part of Ser. No. 872,827, Jan. 27, 1978, abandoned.

[30] Foreign Application Priority Data

Feb. 4, 1977 [DE] Fed. Rep. of Germany ....... 2704650

[51] Int. Cl.³ .................. G06G 7/78; G06F 15/50; B64D 1/02
[52] U.S. Cl. .............................. 364/424; 244/138 R; 364/428
[58] Field of Search ............... 244/138 R, 138 A, 152, 244/17.15, 175; 364/424, 428

[56] References Cited

U.S. PATENT DOCUMENTS 3,625,461 12/1971 Guienne et al. ................ 244/138 R

FOREIGN PATENT DOCUMENTS 2704650 8/1978 Fed. Rep. of Germany ... 244/138 R

Primary Examiner—Joseph F. Ruggiero
Attorney, Agent, or Firm—W. G. Fasse; D. F. Gould

[57] ABSTRACT

A landing gear for loads including cargoes and/or personnel is removably secured to the load. At least one tiltable jet engine forms part of the landing gear and automatically controls the descent movement. A stabilizing mechanism forms part of the landing gear and provides a positioned control for the landing gear and load during descent. Preferably two solid fuel rockets are provided for supporting the load during descent. The rockets are tiltable about an axis extending across the longitudinal axis of the landing gear. The tilting is controlled by a computer on board in accordance with a program present in the computer whereby the landing is substantially independent of local wind conditions and other external factors.

13 Claims, 17 Drawing Figures

THRUST VECTOR

DATA INPUT KEYBOARD FOR DROPPING PROGRAMS

APPARATUS FOR LANDING LOADS FROM TRANSPORT AIRCRAFT, ESPECIALLY LOW FLYING AIRCRAFT

CROSS-REFERENCE TO RELATED APPLICATIONS

The present application is a continuation-in-part application of my copending application Ser. No. 872,827; filed on Jan. 27, 1978 now abandoned.

BACKGROUND OF THE INVENTION

The invention relates to landing gear for the purpose of discharging and landing loads from aircraft, especially from low-flying aircraft. More particularly, the invention is directed to such devices which permit unloading of material and/or personnel from combat aircraft in flight.

It is known to unload cargo including vehicles from flying aircraft by means of one or more parachutes attached to the cargo. This method has certain disadvantages, however, in that it imposes limitations upon the height from which the cargo may be dropped. The minimum height is mainly a function of the time required for the unfolding of the parachute or parachutes, and the subsequent deceleration of the cargo as it approaches the ground. It requires, moreover, a target area free of obstacles that might interfere with the parachutes, and, of course, it is subject to the given wind conditions in the target area.

Another known method of dropping cargo, for instance, motor vehicles and the like from a very low altitude involves pulling the load out of the aircraft by means of a deceleration parachute while the aircraft is flying over the target area at an altitude of a few meters only. Cargo deceleration in a horizontal direction is accomplished by the parachute and surface friction of the cargo on the ground. Owing to the short dropping length, special considerations regarding stabilizing the position of the cargo are not required. However, this method of dropping cargo can be employed only if the target area is free of obstacles in the approach and take-off paths of the aircraft and the distance required for decelerating the load before and after touchdown.

Furthermore, it has been known to reduce the dropping altitude for systems employing parachutes, and to increase the dropping velocity, by using smaller parachutes and by igniting deceleration rockets in the immediate proximity of the ground. Employment of this method has been limited to manned space capsules, and to separate dropping of equipment and personnel, respectively. The area required around the dropping trajectory must, however, be relatively large. Besides, in this known method the target precision is a matter of existing wind conditions.

In accordance with another known method for dropping loads, the load or cargo is drawn out of the aircraft by means of a parachute attached to a rope or cable the length of which approximates the dropping depth whereby the cargo, e.g., a vehicle follows an arcuate path about the deceleration parachute and substantially immediately thereafter touches the ground. The use of this method is limited to cargo as opposed to personnel and may be practiced only where the landing site about the dropping trajectory is larger than in the above mentioned other prior art method. This further known method is also subject to vagaries imposed by wind conditions.

OBJECTS OF THE INVENTION

In view of the above, it is the aim of the invention to achieve the following objects singly or in combination:

to provide an apparatus which permits the dropping of loads comprising cargoes such as equipment and/or personnel with improved target reaching precision while simultaneously requiring a small target area for low flying aircraft;

to provide an apparatus capable of depositing a load on the ground in such a manner that upon touching ground the vertical velocity is substantially zero in a predetermined landing point and the horizontal landing speed may be preselected;

to provide an apparatus of the kind useful for dropping loads from an aircraft, which apparatus is operable substantially independently of existing wind conditions;

to provide and apparatus of the kind referred to which is capable of travelling at a selected horizontal speed upon touching the ground; and to provide a mechanism which will automatically control the entire descent of the load without the need for any corrective action by an operator.

SUMMARY OF THE INVENTION

In accordance with these objects, the invention provides a landing apparatus having a body or frame structure removably securable to the load. At least one tiltable jet engine is secured to the frame structure for automatically controlling the descent motion of the apparatus, as well as a stabilizing mechanism for controlling the position of the apparatus during its descent.

According to the invention the descending load and/or personnel is released from a low flying aircraft. The load is supported by at least one brake rocket or jet engine during the entire descent. Preferably two solid fuel rockets are tiltable about the cross axis of the load. A computer carried on board of the load controls the tilting movement of the brake means in accordance with a tilting program stored in the computer memory. Thus, the invention avoids parachutes, which are sensitive to local wind conditions, and lift producing rotors. Hence, any variably disturbance factors such as local wind velocities and directions have been eliminated.

The present apparatus further includes a position or attitude control system, especially for compensating for wind gusts whereby the aerodynamic angle of incidence is used as a control input value in order to assure substantially constant aerodynamic operating conditions during the descent. As a result of the tilting program and based on the available performance data of the rockets or brake means, the initial conditions of the descent movement are made available to the pilot of the aircraft by the on-board computer so that the pilot is able to approach the landing area with the required altitude, ground speed and flight direction at the precise landing point. The descent motion of the load then takes place fully automatically along a predetermined descent trajectory. Hence the load will contact the predetermined landing point with substantially zero vertical velocity and with a preselected horizontal velocity without the need for any human corrective action. Thus, personnel in the landing craft need not be trained in operating the landing craft.

BRIEF FIGURE DESCRIPTION

In order that the invention may be clearly understood, it will now be described, by way of example, with reference to the accompanying drawings, wherein:

FIG. 7b shows a detail of the input keyboard of FIG. 7a;

DETAILED DESCRIPTION OF PREFERRED EXAMPLE EMBODIMENTS AND OF THE BEST MODE OF THE PRESENT INVENTION

Figure 1:
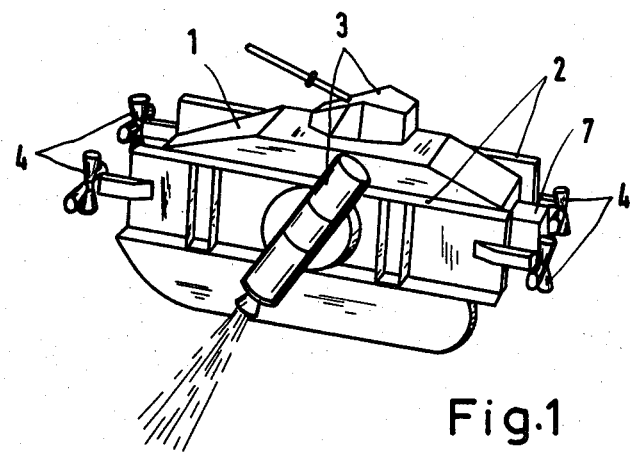
FIG. 1 is a perspective view of the landing gear in accordance with the invention, as mounted on a military tank.

FIG. 1 illustrates a landing apparatus by means of which a vehicle, for example, a military tank may be landed out of an aircraft and onto the ground. The landing apparatus constitutes an auxiliary equipment henceforth referred to as frame structure. The frame structure is secured in a suitable manner to the tank 1. The frame structure comprises mainly two load carriers 2, equipped with descent control rockets 3 and groups of gas pressure jets 4 as well as the equipment container 7. Each of these components may be adapted for securing the component to the load. The equipment container 7 holds the elements which are necessary for the steering and control of the landing apparatus.

When the aircraft has reached the target area, the load or vehicle is ejected from the carrier aircraft at a suitable point of time. For this purpose the carrier aircraft is equipped with catapult means of conventional construction. The ejection takes place in a direction opposite to the flight direction. After a very short, defined period of time the tiltable descending rockets 3 are ignited and the tilting operation of the rockets is started. Initially the nozzles of the rockets or jet engines 3 point about in the approach direction so that at first the horizontal component of the speed of the landing apparatus is reduced. During the descent the rockets 3 are tilted about their tilting axis which extends across their longitudinal axis. Said tilting takes place in accordance with a predetermined tilting program so that the rockets point vertically downwardly at the end of the descent when their firing is stopped. By suitably selecting the starting conditions it is possible to also select the touchdown speed so that the vehicle or tank is capable to travel on the ground immediately upon touchdown. After touchdown the landing apparatus is separated from the load or tank. This may, for example, be accomplished by means of explodable bolts. The effect of the explodable bolts may be enhanced by springs biasing the bolts respectively.

Figure 2:
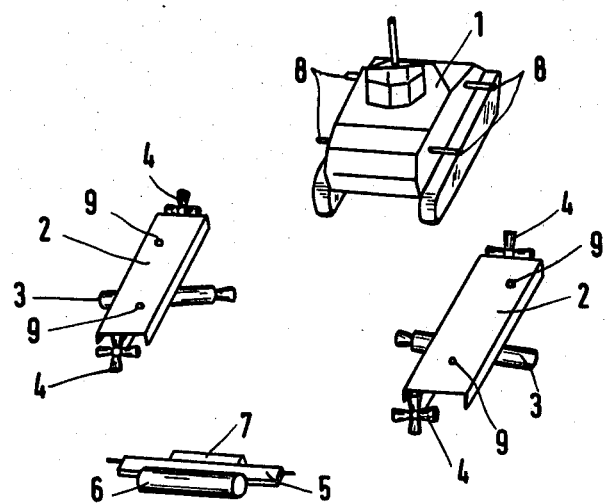
FIG. 2 is an exploded view in perspective, at a reduced scale, showing the tank of FIG. 1 and the components making up the landing gear removed from the tank after the latter has landed.

FIG. 2 illustrates the landed tank 1 and the landing apparatus after it has been blasted off the vehicle. The explosion of the explosive bolts separated the frame structure into the two load carriers 2, the interconnecting girder or beam 5 which supports the pressurized gas container 6 for supplying the sets of jets 4. The equipment container 7 may also be supported by the connecting beam 5. When the landing apparatus is thus disassembled so to speak, the interconnecting conduits, for example, from the pressurized gas container 6 to the jet nozzles 4 are also interrupted in a suitable manner. The tank 1 comprises suitable holding studs 8 fitting into respective holes 9 in the load supporting carriers or girders 2.

Figure 3:
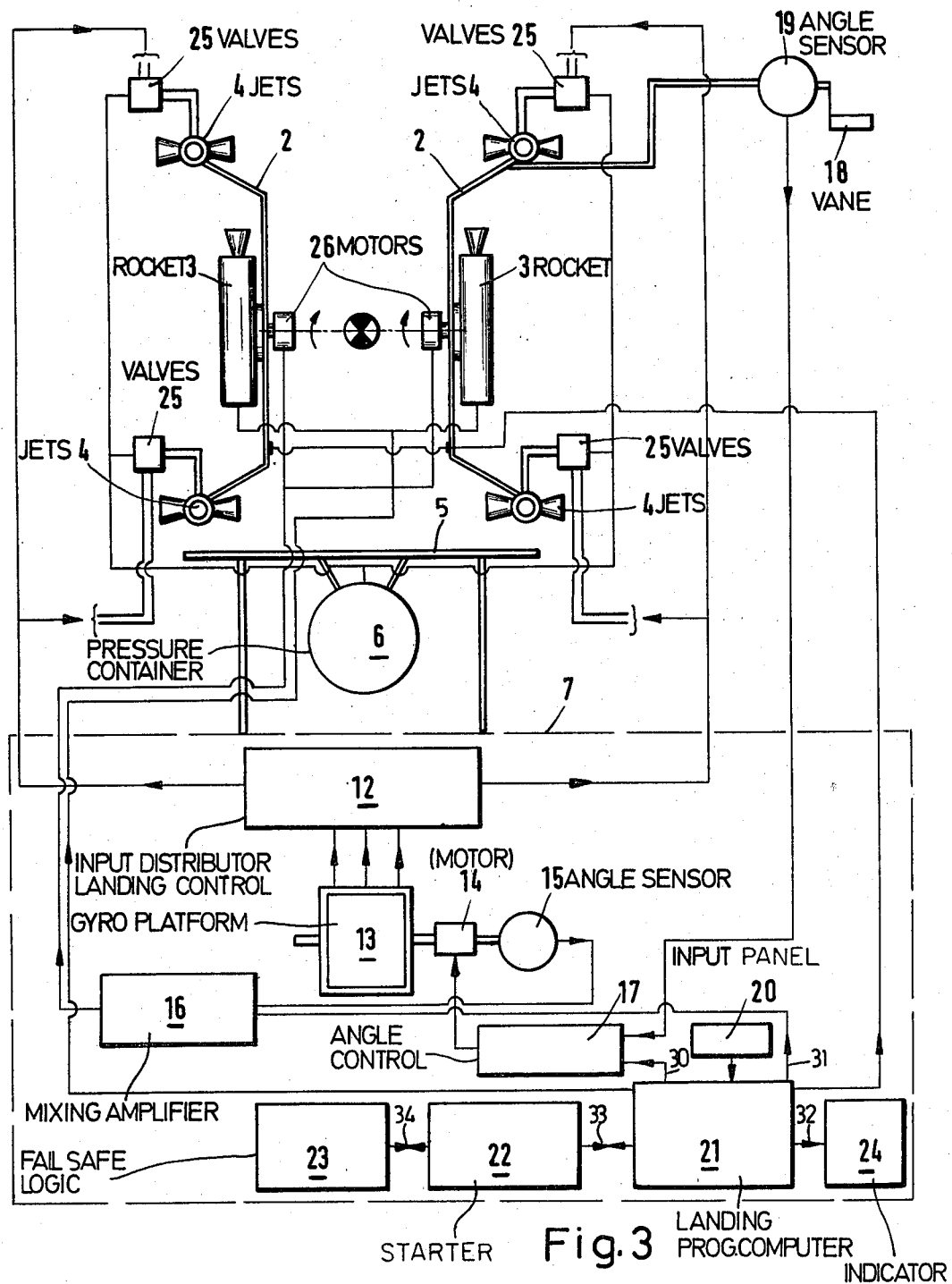
FIG. 3 is a block diagram of the apparatus of the invention, including means for controlling the apparatus.

FIG. 3 illustrates a schematic block diagram of a landing apparatus according to the invention including a position control 12 which also includes an input distributor. The position control 12 receives the input signals from the gyro platform 13 which is adjustable by the adjustment motor 14. The position of the gyro platform 13 and thus of the drive shaft of the motor 14 is sensed by an angle position sensor 15 which provides an electrical output signal in response to the angular position of the motor shaft. The output of the angle sensor 15 is connected to one input of the mixing amplifier 16, the output of which is connected to the rocket angle adjustment motors 26. The motor 14 is controlled by an angle control circuit 17 which is responsive to two input signals. One input signal to the angle of incidence control 17 is provided by the angle sensor 19 provided with a vane 18 responsive to the angle of incidence.

An input control keyboard 20 is operatively connected to a landing program computer 21 which provides several output control signals. One output 30, angle of incidence, of the program computer 21 is connected to a respective input of the angle control 17. Another output 31, tilt angle, is connected to the second input of the mixing amplifier 16. Still another output 32 of the computer 21 is connected to the indicator 24. A further terminal 33 of the program computer 21 is connected to the starter panel 22 to receive computer output data from the panel 22 and to supply computation data to the panel 22. Similarly, a terminal 34 of the panel 22 is connected to an output terminal of a fail-safe logic circuit 23. The landing apparatus further comprises groups of values 25 operatively interconnected between the gas jets 4 and the gas pressure container 6. The descending operation is usually controlled manually by the pilot of the carrier aircraft. First, the necessary data are supplied through the input keyboard 20 to the program computer 21. After the actuation of a start control in the starter panel 22, the following sequential steps are performed by a sequence control, integrated in the computer 21.

(a) The following components are activated: position control 12, gyro platform 13, valve groups 25, and groups of jets 4;

(b) ejection by catapult means installed in the carrier aircraft;

(c) firing of the rockets 3;

(d) lock-in of an angle of incidence program as preselected by the input keyboard 20, through the program computer 21, the angle control 17, and the angle adjustment motor 14; and (e) lock-in of a tilting program in the computer 21 corresponding to the input data for the rockets 3 through the mixing amplifier 16 and the tilting motors 26, whereby the mixing amplifier 16 heterodynes the signal from the angle sensor 15 and the signal representing the tilting program as provided by the computer 21.

The tilting program is switched off through the computer 21 immediately upon reaching of the vertical position by the rockets 3. When the initial vertical speed has been sufficiently reduced the computer 21 switches off the thrust of the rockets 3 and the disassembly of the landing apparatus is triggered. The predetermined horizontal speed of the landed vehicle as being fed into the system through the input keyboard 20 whereby the vehicle 1 is immediately ready for free maneuvering when it touches the ground.

Figure 4:
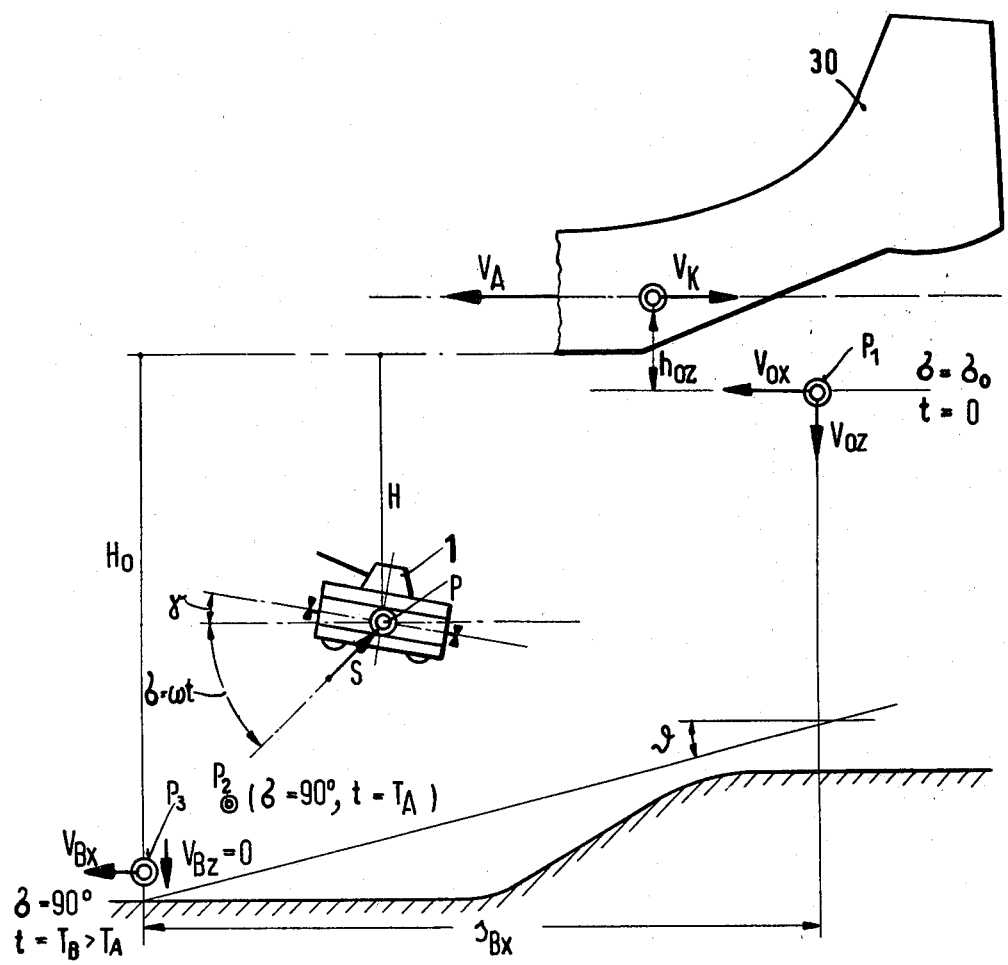
FIG. 4 is a schematic illustration of the gear in operation landing a tank.

FIG. 4 shows an illustration of the landing apparatus according to the invention in its operation of landing a tank 1 from an aircraft 30. The aircraft 30 flies at an approach altitude $H_o$. The approach altitude is, for example, measured just prior to the landing of the tank 1. Such measurement is accomplished by conventional means such as a radio-altimeter which ascertains an angle and the travelling time of a wave. This altitude $H_o$ is supplied to the computer 21 for making any necessary corrections, whereby simultaneously the program sequence of the automatic landing is started. The aircraft has the approach speed $V_A$. The actual landing sequence is started by means of a starting switch or the like forming part of the starter panel 22. As a result of the actuation of the starter the landing apparatus is ejected from the aircraft by means of a catapult rigidly installed in the loading space of the aircraft. A catapult imparts to the landing apparatus and its load a speed $V_K$ whereby the position control becomes automatically effective.

After falling freely for a distance $H_{oz}$ the center of gravity of the landing apparatus and its load is located in position $P_1$. In this point the center of gravity has the speed components $v_{ox}$ and $v_{oz}$. In this position the two rockets are ignited. Initially the thrust jets of these rockets are directed about in the direction $v_{ox}$. Simultaneously the tilting program is started. During the continuation of the descent the speed component $v_x$ is first reduced and then the speed component $v_z$ is reduced as a result of the tilting of the rockets 3. FIG. 4 illustrates the tank 1 and the landing apparatus at a random point of time during the descent. At this point of time P the landing apparatus travels with the speed component $v_x$ and $v_z$ both of which are functions of time f(t). At the point of time P the thrust vector S has rotated already about the angle $\delta = \omega t$ relative to the horizontal whereby $\omega$ is assumed to be constant in this example. It is further assumed that the landing apparatus has taken up an angular position $\gamma$ also relative to the horizontal and due to the control of the angle of incidence at point $P_2$ the maximum tilting angle $\delta = 90°$ has been reached after the time $t = T_A$ whereby the tilting program is concluded. At this point the initial vertical speed $v_z$-$v_{oz}$ has not yet been reduced. However, when the landing apparatus and its load has reached the point $P_3$ the speed $v_z$ has become zero and the tilting angle $\delta$ remains constant at 90°. Thus, the vertical touchdown speed $V_{Bz} = 0$. The horizontal touchdown speed $V_{Bx}$ corresponds to the pre-programmed value. When the point $P_3$ is reached, the time $T_B$ has elapsed and the thrust of the rockets 3 is switched off, for example, by a sudden pressure reduction in the combustion chambers.

Figure 5:
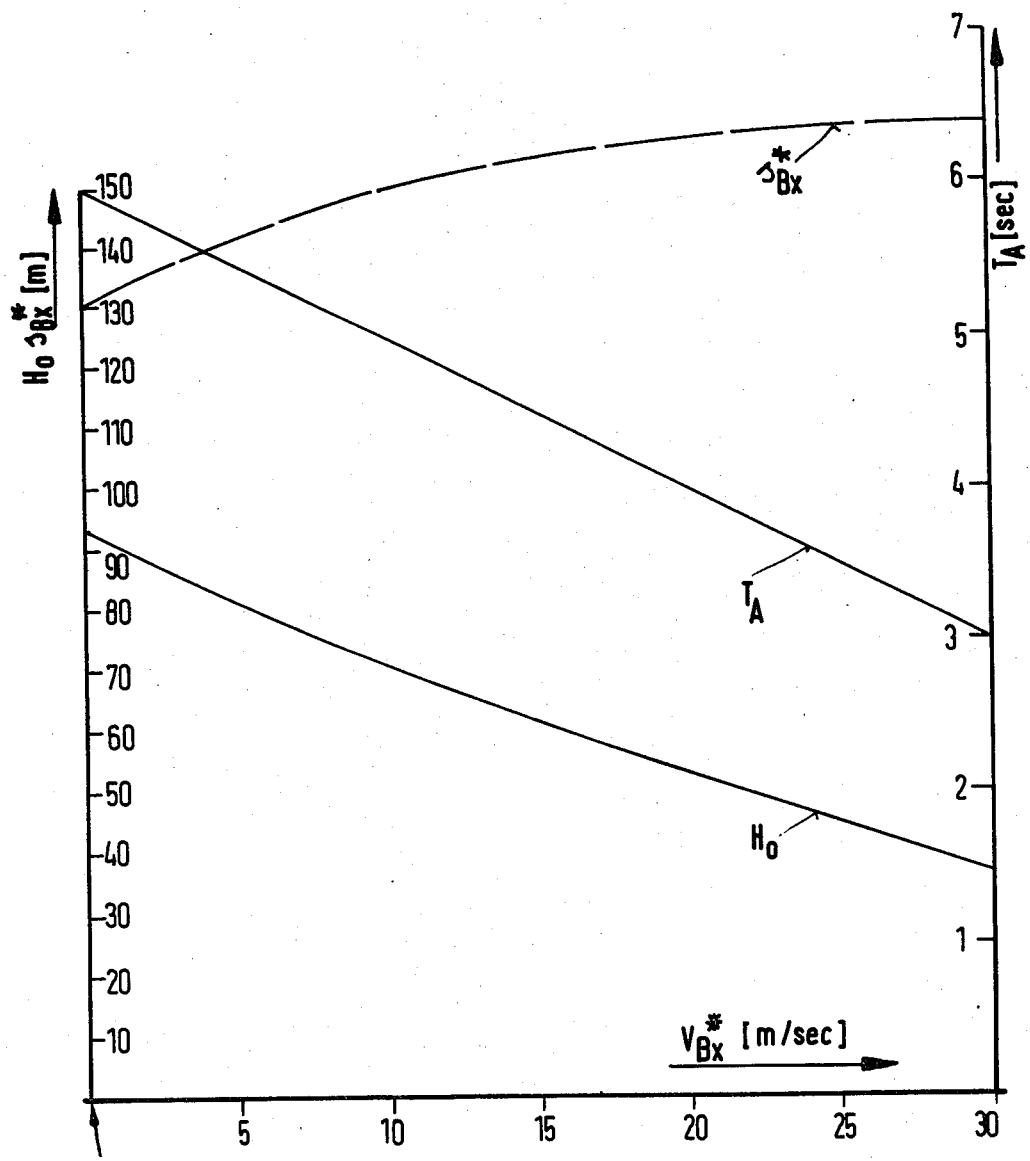
FIG. 5 is a diagram showing the various factors existing during a landing or dropping operation which are taken into account by the operation of the present apparatus.

Starting with the point of time $P_1$ when the tilting program starts to the point of time $P_3$ when the firing of the rockets 3 stops, the horizontal distance $s_{Bx}$ has been traversed. FIG. 5 illustrates a diagram for explaining the interrelationship between the various landing steps which make up the landing procedure. On the left side of FIG. 5 the vertical axis or ordinate represents with its scale the altitude $H_o$ as well as the horizontal distance traversed namely $s_{Bx}^*$. The star in $s_{Bx}^*$ indicates that the drag or air resistance has not been taken into account. On the horizontal axis the scale indicates the horizontal touchdown speed $V_{Bx}^*$ whereby the star again indicates that the drag or air resistance has not been taken into account. The right vertical ordinate indicates the tilting time $T_A$. Thus, the curve $H_o$ indicates said altitude, the curve $T_A$ indicates the tilting time and the curve $s_{Bx}^*$ indicates the horizontal distance traversed by the landing apparatus. All curves are shown as a function of the horizontal landing speed $V_{Bx}^*$ with the following parameters:

1. $v_{ox} = 60$ m/s;
2. $v_{oz} = 6.3$ m/s;
3. $\delta_o = 0°$;
4. the lift during descent is neutral.

The neutral lift during descent is to be considered as an ideal instance. In practice such an ideal situation is achieved only approximately. Especially at the end of the descent trajectory, the ratio between lift and thrust is so small that the influence of the angle of incidence disappears. The chart of FIG. 5 illustrates that approach altitudes in the range of 35 m to 92 m ought to be expected whereby the descent times are between 4 and 7 seconds while the tilting time $T_A$ is within the range of 3 to 6.5 seconds.

For producing an artificial stability and damping of the landing apparatus it is preferable to employ so-called simple captive gyros (rate-gyros) on the platform 13 which provides the required measured values. The measured angular velocities about the main axis of the landing apparatus are supplied in the described example to the valve groups 25 through a landing control or regulator 12 to control the valve opening speeds in an opposing sense. Further, electrical differential signals are employed to accomplish artificial damping. According to an embodiment or further development of the invention the tilting motion of the rockets 3, that is of the resulting thrust vector, may be controlled in accordance with random tilting programs having variable angular speeds.

According to another embodiment of the invention the jets or rockets engines may have the same thrust. Nevertheless it is possible to realize different descent programs by varying the initial tilting angle $\delta_o$ and by also varying the tilting time $T_B$.

According to a further modification of the invention the position control is used to control the angle of incidence as a function of time in such a manner that the influence of lift substantially disappears. According to a still further embodiment of the invention the landing apparatus is provided with at least one aerodynamic rudder device. In addition, it is possible to construct the landing apparatus as an integral component of the load to be landed, for example, a vehicle.

Figure 6:
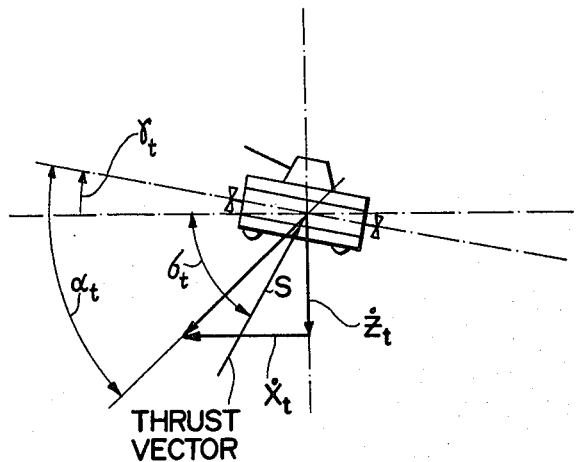
FIG. 6 shows the load during its descent.

FIG. 6 is relevant in connection with certain of the symbols used in the equations summarized in the following text. These equations employ the additional symbols as follows:

- $(x, z)_t$ = main coordinates of a coordinate system shown in FIG. 6;
- $(\dot{x}, \ddot{x}, \dot{z}, \ddot{z})_t$ = time derivative functions in the main coordinates;
- $v_0$ = horizontal starting speed;
- $b$ = thrust caused acceleration;
- $b_t$ = acceleration at time t;
- $g$ = gravitational acceleration;
- $S$ = thrust vector;
- $m$ = mass;
- $m_0$ = starting mass at time zero $t=0$;
- $m_t$ = mass at time t;
- $t$ = time (t as index means time variable value);
- $T_A$ = tilting time of the rockets;
- $T_B$ = burning time till rocket propulsion is extinguished;
- $T_C$ = total burning time of the rockets of a class or type;
- $w$ = beam or jet speed of the rockets;
- $c_{xt}, c_{zt}$ = air force factors relative to the main coordinates;
- $\rho$ = air density;
- $\sigma_t$ = tilting angle of the rockets;
- $\sigma_0$ = initial tilt angle of the rockets;
- $\omega = \dot{\sigma}$ = constant = angular tilting velocity;
- $\alpha_t$ = angle of incidence;
- $\gamma_t$ = angle between longitudinal axis of the system and the horizontal;
- $\gamma_{kt}$ = commanded angle of attitude or position;
- $\gamma_{wt}$ = rated value of angle of attitude or position;
- $\gamma_{xt}$ = measured value of angle of attitude or position;
- $\dot{\gamma}_t$ = angular velocity of attitude or position change;
- $v_{Bx}$ = predetermined horizontal speed;
- $v_{Bx}^*$ = predetermined horizontal speed disregarding the influence of the air resistance;
- $h_{oz}$ = following altitude without thrust after catapulting the system out of the carrier aircraft;
- $\omega$ = angular velocity;
- $D$ = torque;
- $\tau$ = delay;
- $c = c_y$ = nozzle opening control signal;
- $s$ = imaginary operator;
- $F_D$ = frequency response characteristic;
- $c_{Dy}$ = torque constant;
- $i$ = reciprocal integration time constant;
- $n$ = proportionality factor for dynamic stabilization.

The following mathematical equations are used for developing and constructing components of the present system and for use as computing equations in the airborne landing program computer 21. The tilting program for the rockets uses a constant angular velocity $\omega$ = constant.

$$\dot{x}_t = v_{ox} - \int_0^t b_t \cos(\sigma_o + \omega \cdot t) dt - \quad \text{Equation (1)}$$

$$\int_{t=o}^{t} c_{xt} \frac{(\dot{x})^2_t}{m_t} dt \Rightarrow x_t = T_A$$

$$x_t = \int_0^{T_A} \dot{x}_t \, dt \quad (c_x = \text{horizontal air force factor or coefficient}) \quad \text{Equation (1a)}$$

$$\dot{z}_t = g \cdot t + \int_0^t b_t \sin(\sigma_o + \omega \cdot t) dt + \quad \text{Equation (2)}$$

$$\int_{t=o}^{t} c_{zt} \frac{(\dot{z})^2_t}{m_t} dt \Rightarrow z_t = T_A$$

$$z_t = \int_0^{T_A} \dot{z}_t \, dt \quad (c_{zt} = \text{vertical air force factor or coefficient}) \quad \text{Equation (2a)}$$

The following relationships apply:

$$c_{xt} = f(\dot{x}, \dot{z}, \gamma)_t \quad \text{Equation (3)}$$

and $$c_{zt} = f(\dot{x}, \dot{z}, \gamma)_t \quad \text{Equation (4)}$$

The values used are shown in FIG. 6. The following applies:

$$tg(\alpha - \gamma)_t = \left(\frac{\dot{z}}{\dot{x}}\right)_t,$$

$$\sigma_t = \omega \cdot t \text{ and } 0 \leq t \leq T_A$$

It follows:

$$m_t = m_o - \frac{S}{w} \cdot t \text{ and} \quad \text{Equation (5)}$$

$$b_t = \frac{S}{m_t}. \quad \text{Equation (6)}$$

Calculation of a program example for a descent with neutral lift. Any influence of the air forces on the trajectory in the Z-direction are disregarded, which means:

$$\int\int_{t=o}^{T_A} c_{zt} \frac{(\dot{z})^2}{m_t} dt \approx 0. \quad \text{Equation (7)}$$

$$b_t \approx \bar{b} = \frac{2 \cdot S}{m_o + m_{T_A}} = b \quad \text{(simplified)} \quad \text{Equation (8)}$$

With a suitably selected limiting condition:

$$\sigma_o + \omega \cdot T_A = \frac{\pi}{2} \quad \text{Equation (9)}$$

it follows from Equation (1)

$$x_{T_A} \cong v_o T_A - \frac{b T_A^2}{\left(\frac{\pi}{2} - \sigma_o\right)^2} \left[ \cos \sigma_o (1 - \sin \sigma_o) - \right. \quad \text{Equation (10)}$$

$$\left. \left(\frac{\pi}{2} - \sigma_o\right) \sin \sigma_o + \sin \sigma_o \cos \sigma_o \right] - \frac{1}{m} \int\int_{t=o}^{T_A} c_{xt}(\dot{x}_t)^2 dt$$

-continued $$m = \frac{m_o + m_{TA}}{2} \quad \text{Equation (11)}$$

From Equation (2) it follows:

$$z_{TA} = -\frac{g}{2} T_A^2 + \frac{b\, T_A^2}{\left(\frac{\pi}{2} - \sigma_o\right)^2} \left[ \sin \sigma_o (1 - \sin \sigma_o) + \left(\frac{\pi}{2} - \sigma_o\right) \cos \sigma_o - \cos^2 \sigma_o \right] \quad \text{Equation (12)}$$

For the condition $\dot{z}_{TA} = 0$ it follows further from Equation (2):

$$\ddot{z}_{TA} \Rightarrow 0 \cong -g + \frac{b}{\frac{\pi}{2} - \sigma_o} [\sin \sigma_o \cos \sigma_o + \cos \sigma_o (1 - \sin \sigma_o)] \quad \text{Equation (13)}$$

The relationship between thrust, mass and initial rocket tilting angle is as follows and important for engineering or technical applications:

$$\frac{b}{g} = \frac{s}{m \cdot g} = \frac{\frac{\pi}{2} - \sigma_o}{\sin \sigma_o \cos \sigma_o + \cos \sigma_o (1 - \sin \sigma_o)} \Rightarrow \sigma_o \quad \text{Equation (14)}$$

The corresponding tilting time $T_A$ of the rockets follows from equations (1) and (14).

$$\dot{x}_{TA} = v_o - \frac{b\, T_A}{\frac{\pi}{2} - \sigma_o} [\cos \sigma_o - \sin \sigma_o (1 - \sin \sigma_o)] - \frac{1}{m} \int_{t=0}^{T_A} c_{xt}(\dot{x})_t^2 dt \quad \text{Equation (15)}$$

Disregarding as a first approximation the last term in Equation (15), it follows:

$$T_A \cong \frac{\sin \sigma_o \cos \sigma_o + \cos \sigma_o (1 - \sin \sigma_o)}{\cos^2 \sigma_o - \sin \sigma_o (1 - \sin \sigma_o)} \cdot \frac{(v_o - \dot{x}_{TA})}{g} \quad \text{Equation (16)}$$

Using Equation (9) it follows:

$$\omega = \frac{\frac{\pi}{2} - \sigma_o}{T_A} \quad \text{Equation (16a)}$$

$$T_B = T_A \quad \text{Equation (16b)}$$

$$tg\gamma_{kt} = \frac{tg\alpha_{wt} - tg\alpha_{xt}}{1 + tg\alpha_{wt} \cdot tg\alpha_{xt}} \Rightarrow \gamma_{kt} \quad \text{Equation (17)}$$

$$S_{yt} \cong S_{oyt} - \tau \cdot \dot{S}_{yt} \quad \text{Equation (18)}$$

$$D_{yt} = S_{yt} \cdot 1 = ⑫_y \cdot \ddot{\gamma}_{xt} \quad \text{Equation (19)}$$

$$S_{oyt} \cdot 1 \cong c \cdot y_{yt} \quad \text{Equation (20)}$$

$$F_D = \frac{\gamma_x}{y_y} = \frac{C_{Dy}}{⑫_y} \cdot \frac{1}{S^2 + \tau S^3} \quad \text{Equation (21)}$$

-continued $$F_c \cong \frac{y_y}{\gamma_w - \gamma_x} = i + n \cdot S \quad \text{Equation (22)}$$

$$\frac{\gamma_x}{\gamma_w} = \frac{1}{1 + \frac{1}{F_c \cdot F_D}} = F\Sigma \quad \text{Equation (23)}$$

$$F\Sigma \cong \frac{1 + \frac{n}{i} \cdot s}{1 + \frac{n}{i} \cdot s + \frac{⑫_y}{C_{Dy} \cdot i} s^2 + \frac{⑫ \cdot \tau}{C_{Dy} \cdot i} s^3} \quad \text{Equation (24)}$$

$$\xi_w = \eta_w = 0. \quad \text{Equation (25)}$$

The foregoing equations will be mentioned to the extent necessary in the following text but not necessarily in the listed sequence.

Figure 7A:
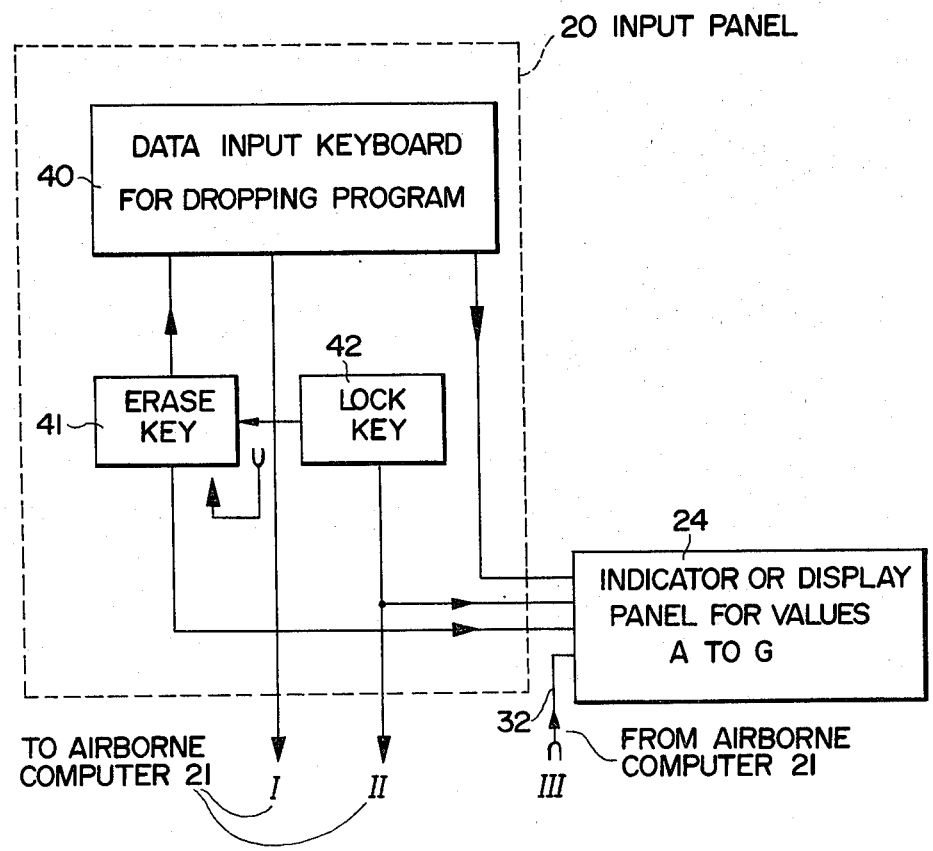
FIG. 7a shows a block diagram of a computer input keyboard including an indicator panel.

FIG. 7a illustrates further details of the input panel 20 and its circuit connection to the display panel 24. The input panel 20 may generally be referred to as input keyboard. This display panel 24 may generally be referred to as indicator. The input panel 20 comprises a keyboard 40 proper for the dropping program as well as an erase key 41 as well as a locking key 42. The keyboard 40 is operatively connected through conductor means to the indicator 24 whereby the manually entered values appear on the indicator 24 for checking purposes. The keyboard 40 is connected through the terminal I to the on-board computer 21 also referred to as the landing program computer, for manually entering values into the computer 21. Any value that may have been entered erroneously may be erased by depressing the erase key 41. After an entered value has been erased, the correct value may be entered. The locking key 42 is operatively connected to the computer 21, to the key 41, and to the indicator 24. If the program has been completely entered manually through the keyboard, the program is locked by depressing the key 42. Thus, any further entering, for example, by inadvertent operation of the keys, is prevented. A locked program may be unlocked again by a special operating procedure. For instance, in the illustrated example embodiments the unlocking may be accomplished by depressing the key 41 three times at one second intervals.

Figure 7B:
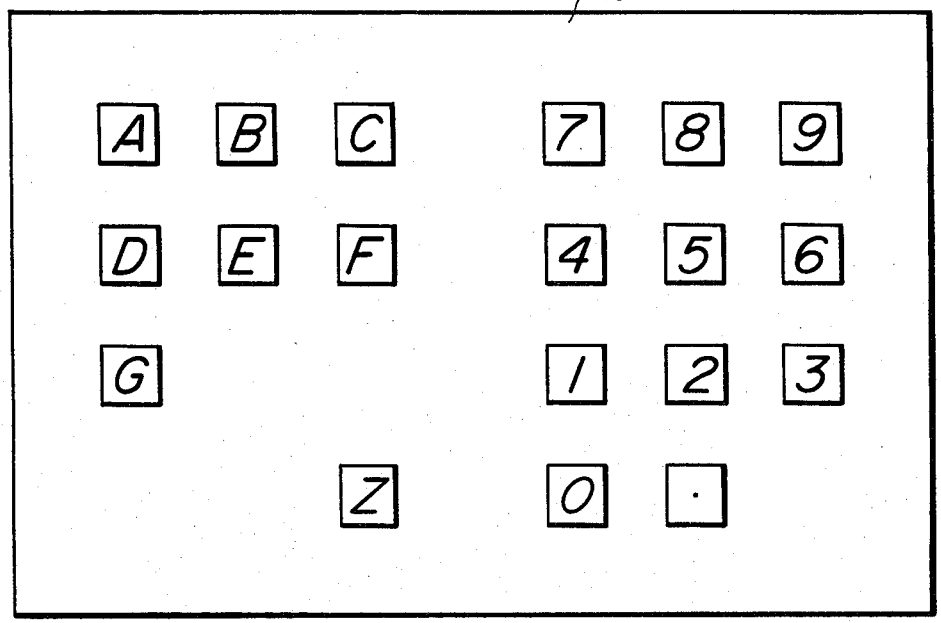

FIG. 7b illustrates the input keyboard 40 for the dropping program. The keyboard comprises the keys A, B, C, D, E, F, and G, as well as Z having the following connotation or significance.

Key A: means desired touchdown speed $V_{Bx}$;
Key B: means flight direction of oncoming aircraft;
Key C: means identification or flagging for given burning duration and thrust of different rocket types;
Key D: means identification of different angle of indicence programs;
Key E: means starting mass $m_o$;
Key F: means component of expected wind velocity at the landing location relative to the flight direction B;
Key G: means elevation of the landing location above mean sea level; and
Key Z: means input "completed".

The airborne landing program computer 21 is programmed in such a manner that the computing values may be entered in sequence without actuation of any operational keys. The entered values appear for checking purposes on the indicator 24. When the entering of values is completed, the key Z is depressed signifying such completion. Actuation of the Z-key starts the sequence of the computing program.

Figure 8:
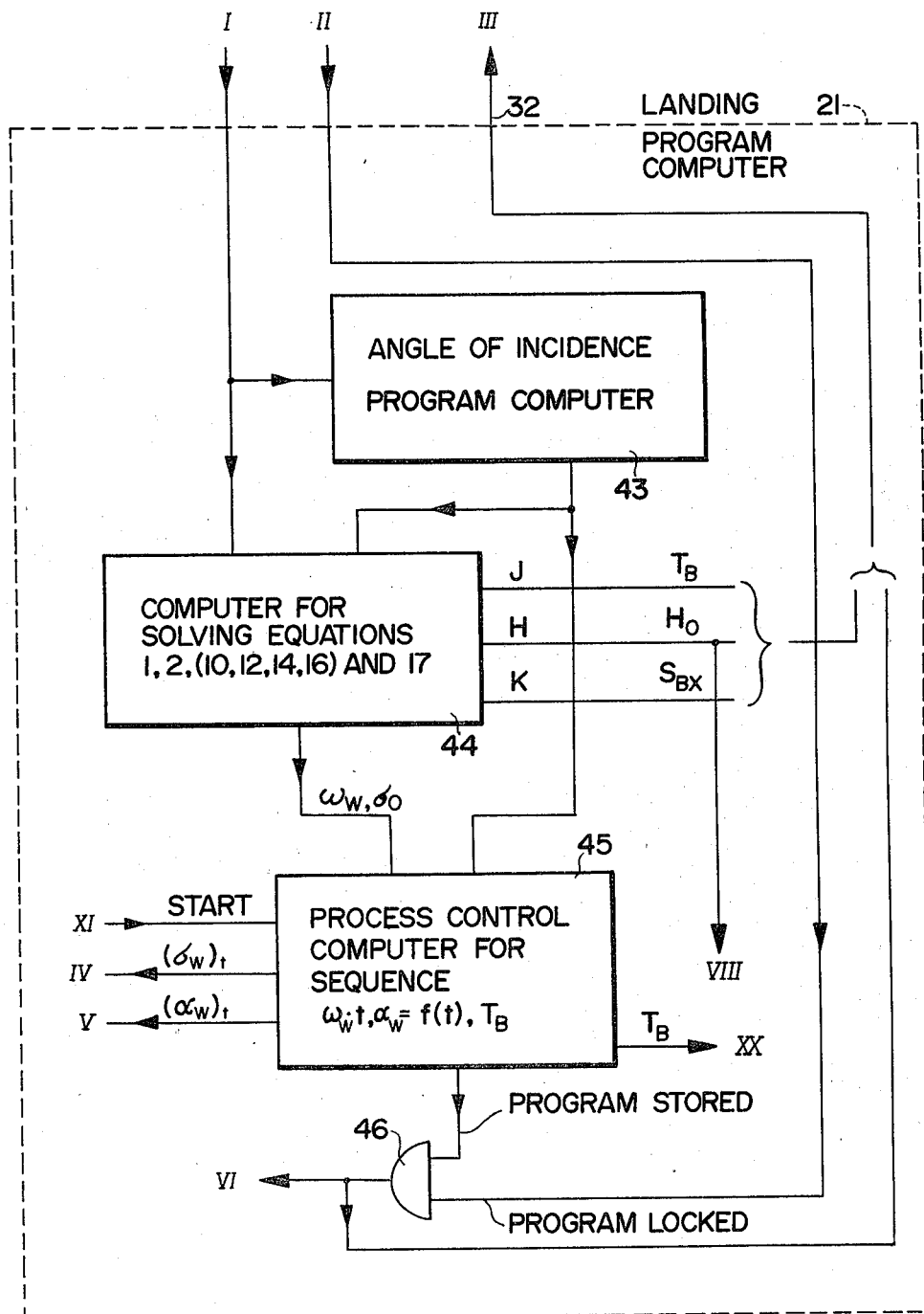
FIG. 8 illustrates a block circuit diagram of a landing program computer as used in the present invention.
Figure 13:
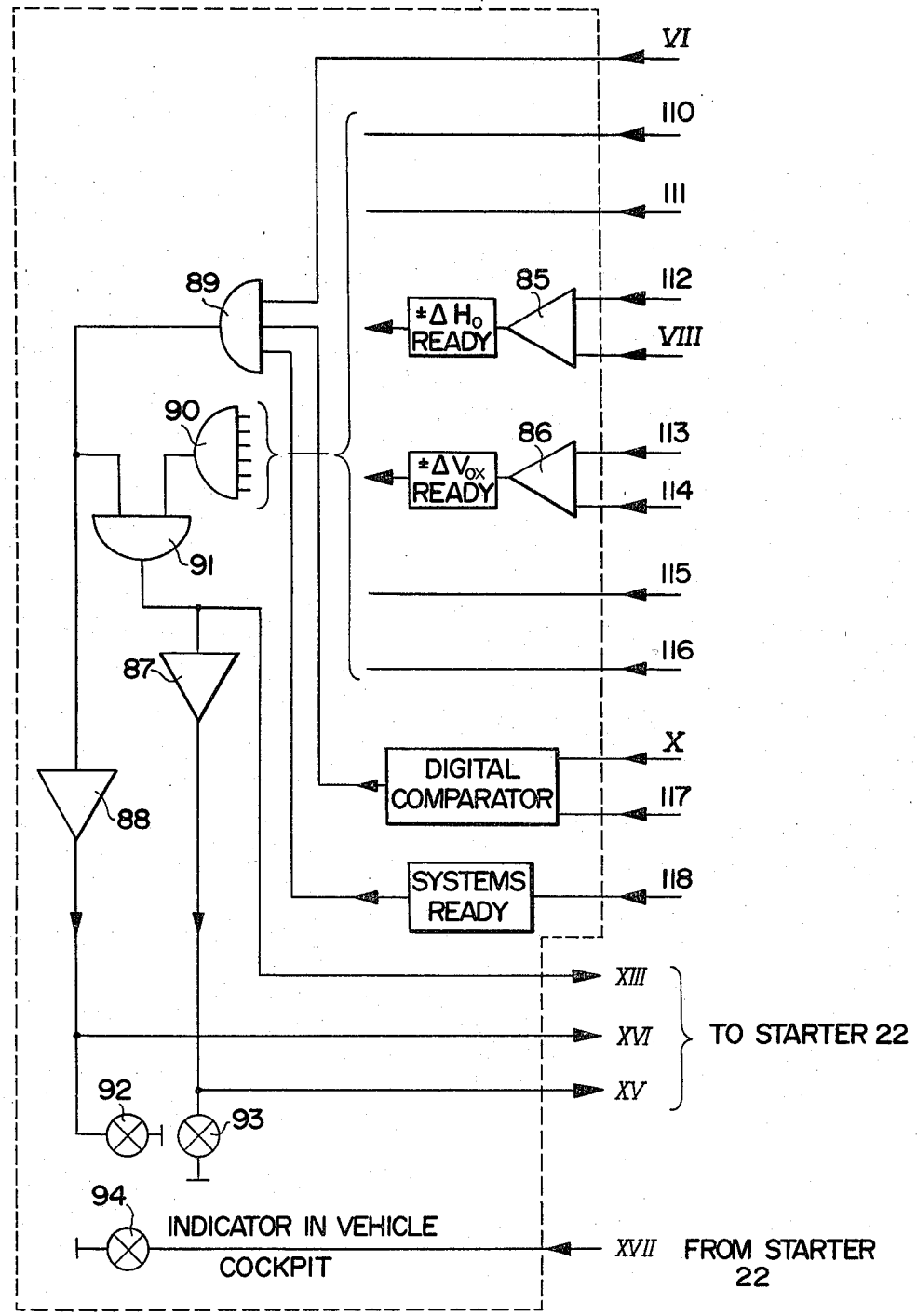
FIG. 13 illustrates a logic block circuit diagram of the safety features of the present system.
Figure 14:
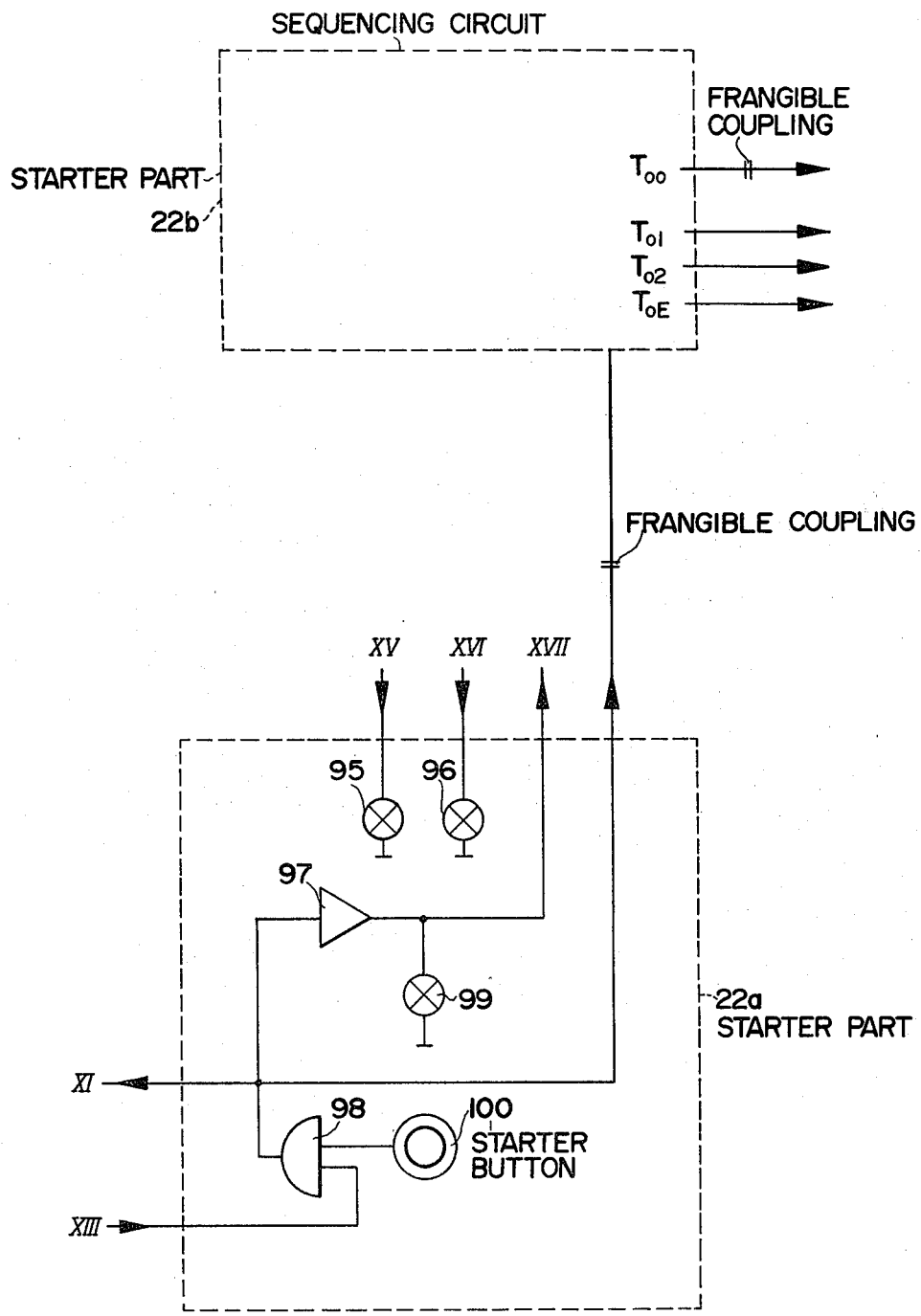
FIG. 14 is a block diagram of a starting device.

FIG. 8 illustrates the basic structure of the airborne landing program computer 21 which is also shown in FIG. 3. Computer 21 comprises three different arithmetic units 43, 44, and 45 as well as an AND-gate 46 operatively connected as shown in FIG. 8. Terminals I and II are operatively connected to the input panel 20. Terminal III is operatively connected through the conductor 32 to the indicator 24 shown in FIG. 7a, whereby the resulting values H, I, and K are supplied to the indicator 24, wherein H corresponds to $H_o$, I corresponds to $T_B$, and K corresponds to $s_{Bx}$ in accordance with FIG. 4. Terminal IV is operatively connected to a mixing amplifier 80 shown in FIG. 12. Terminal V is operatively connected to an arithmetic unit 17 shown in FIG. 9. The output of the AND-gate 46 is connected to the terminal III and thus to the indicator 24. Further, the terminal VI which is connected to the output of the And-gate 46 is in turn connected to a respective input terminal in the fail-safe logic circuit 23 as shown in FIG. 13. The output terminal VIII of the arithmetic unit 44 is connected to the fail-safe logic circuit 23. The output terminal XX of the arithmetic unit 45 is connected to the solid fuel rockets 3, for example, shown in FIG. 12. The arithmetic unit 45 is further connected to the terminal XI to the starter device 22 as shown in FIG. 14.

The forces of the air which may occur during the descent as a function of the angle of incidence $\alpha$ may have, among others, the effect that they influence the horizontal speed within certain limits and having regard to the starting conditions. Thus, according to the invention the range of the possible horizontal speeds at the dropping or contact point is divided into several sections. Each such horizontal speed section or rather range is coordinated with a given fixed and predetermined angle of incidence program. The arithmetic unit 43 automatically selects the angle of incidence $\alpha$ program on the basis of the input data. The arithmetic unit 43 further calculates the angle of incidence curve which is determined by the respective landing program as a function of time. The angle of incidence curve is supplied to the arithmetic unit 45 by the unit 43. The arithmetic unit 45 operates as a process computer.

The arithmetic unit 44 solves the equations (10), (12), (14), (15) and (17) listed above. Thus, the arithmetic unit 44 provides the results for $\omega_w$ and $\sigma_o$ which are supplied as respective signals to the arithmetic unit 45. $\omega_w$ corresponds to the rated value of the rocket tilting velocity and $\sigma_o$ corresponds to the initial tilting angle of the rockets. Based on the values supplied by the arithmetic units 43 and 44, the arithmetic unit 45 supplies at the respective outputs the result values or magnitudes shown in FIG. 8. $\sigma_w$ represents the rated value of the tilting angle of the rockets, $\alpha_w$ is the rated value of the angle of incidence, and $T_B$ corresponds to the burning duration of the rocket, all as set forth in the above listing. The arithmetic unit 45 receives the starting signal from the starter 22 through the input terminal XI. When the time $T_B$ has passed, the arithmetic unit 45 provides a signal at the output terminal XX, whereby the thrust of the rockets is switched off. Preferably, the switching off of the rockets is accomplished by decompression.

The arithmetic unit 45 supplies a corresponding signal to the AND-gate 46 when the landing program is completely stored. Upon actuation of the locking key 42 as shown in FIG. 7a the AND-gate 46 receives the "program locked" signal through the terminal II. If both signals are present at the inputs of the AND-gate 46, the latter provides at the terminal VI a respective signal to the fail-safe logic circuit 23 shown in FIG. 13 to signify that the program is stored and locked.

Figure 9:
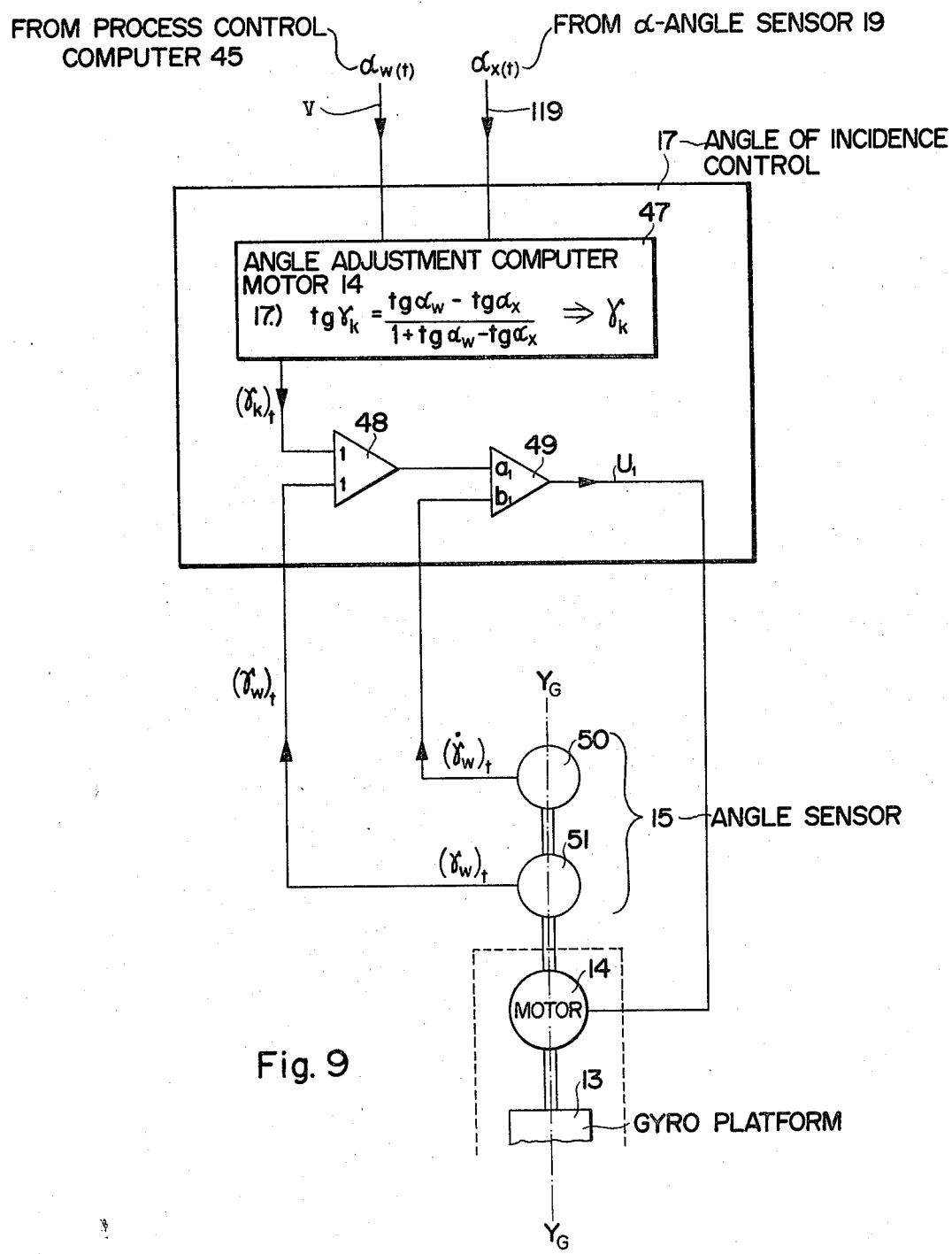
FIG. 9 is a circuit arrangement, partially in block form, for controlling a rate gyro platform.

FIG. 9 illustrates the basic arrangement of the angle control 17 shown in FIG. 3. This control circuit arrangement comprises substantially an arithmetic unit 47 and operational amplifiers 48 and 49 as well as a tacho-generator 50 and the angle sensor proper 51 as well as the motor 14 and the gyro platform 13 operatively interconnected as shown in FIG. 9. The arithmetic unit 47 receives through the terminal V from the arithmetic unit 45 of the landing program computer 21, the rated value $\alpha$ w(t) of the incidence angle $\alpha$ as a function of time. The arithmetic unit 47 also receives the actual angle of incidence $\alpha_x(t)$ from the angle sensor 19 shown in FIG. 3. The arithmetic unit 47 compares the rated value with the actual or measured value to form a difference control signal $\gamma_k = f(t)$, which is supplied to the amplifier 48. $\gamma_k$ corresponds to the commanded attitude angle of a reference, fixed plane in the load such as a vehicle, relative to the horizontal. In order to realize a desired attitude angle $\gamma_x$ it is necessary that the gyro platform 13 is rotated by the motor 14 relative to the landing apparatus by the angle $\gamma_w$. The respective control of the motor 14 is accomplished through the two adding, mixing amplifiers 48 and 49 shown in FIG. 9. The control signal $U_1$ is supplied by the amplifier 49 to the motor 14 and the magnitude and polarity of the signal $U_1$ may vary.

The angle sensor 51, for example, in the form of a potentiometer, provides the tilting angle of the gyro platform 13 as an analog signal $\gamma_w$ to the amplifier 48 as a function of time. The amplifier 48 in turn supplies a signal proportional to said angle to the amplifier 49. The tacho-generator 50 provides a signal which is proportional to the angular velocity $\dot{\gamma}_w$ which stabilizes the closed loop control through the amplifier 49. The platform 13 is rotated by the motor 14 about the y-axis or about another axis extending in parallel to the y-axis of the coordinate system. The rate gyro 77 shown in FIG. 10b, which is mounted on the gyro-platform 13 supplies a signal representing the tilting or rotation of the platform 13. This signal is proportional to the difference between the angular velocity of the landing apparatus and the platform 13 relative to the y-axis. This difference signal controls the steering nozzles 4 according to FIG. 3 in such a manner that the landing apparatus performs the commanded rotational movement about the y-axis which extends perpendicularly to the plane of the drawing as shown in FIG. 10a.

Figure 10A:
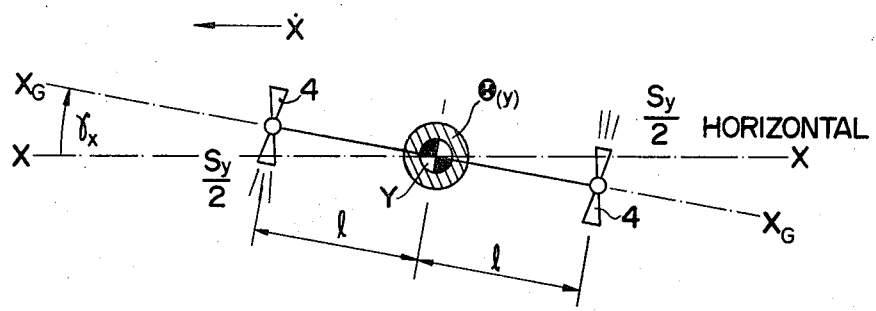
FIG. 10a shows the basic features of the landing gear.
Figure 10B:
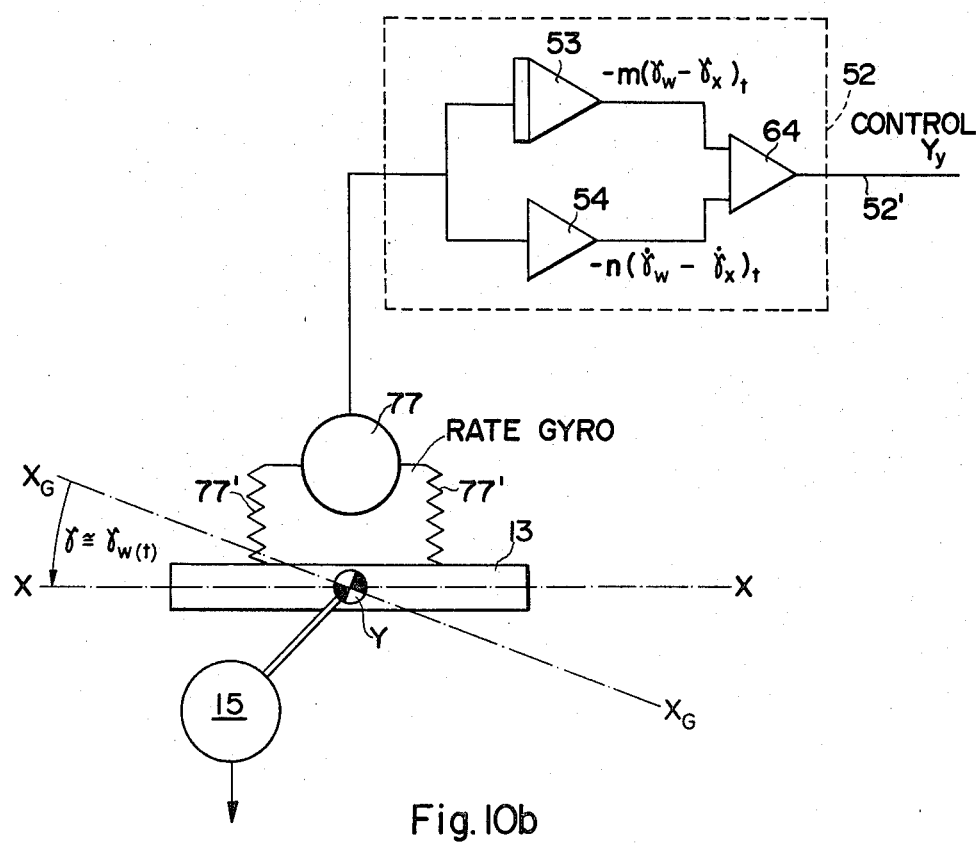
FIG. 10b shows a rate gyro platform as part of the closed loop control circuit, for the-y-axis.

FIGS. 10a and 10b illustrate the just described relationships. FIG. 10a shows the basic features of the landing apparatus. The y-axis extends, as mentioned, perpendicularly to the plane of the drawings and through the center of gravity of the landing apparatus which is illustrated as a mass rotatable about this axis and having the inertia moment ⒽⒽ (y). The steering nozzles 4 are spaced from the center of gravity by the distance "1". The longitudinal axis $x_G$ is fixed in the landing apparatus and includes with the horizontal y-axis the angle $\gamma_x$. Each of the steering nozzles 4 at the bow and stern of the landing apparatus produce respectively the thrust $S_y/2$. FIG. 10b shows the basic diagram of the gyro-platform 13 with the spring supported rate gyro 77. The gyro-platform 13 extends in parallel to the x-axis and forms, due to the tilted position of the landing apparatus, with the axis $x_G$ the angle $\gamma_x$. The angle sensor 15 operatively connected to the gyro-platform 13 provides at the output terminal VII a signal proportional to the angle $\gamma_w(t)$. The output signal of the rated gyro 77 which is elastically secured to the platform 13 by springs 77' is supplied to the control circuit 52 comprising an integrator circuit 53 and the two amplifiers 54 and 64 operatively interconnected as shown in FIG. 10b. The output of the control circuit 52 supplies the signal $Y_y$. This signal is produced by adding in the amplifier 64 the signals as marked at the inputs of the amplifier 64 in FIG. 10b. In this connection, "i" is a reciprocal integration time constant for the static stabilization for the landing apparatus "n" is a proportionality factor for the dynamic stabilization. The adjustment magnitude or value $Y_y$ controls the steering nozzles 4 through the control circuit 52 whereby the dynamic relationships are given by the equations (18), (19), and (20) set forth above. Based on these equations (18), (19) and (20) the frequency curves or characteristics are given, in operator notation, by equations (21), (22), (23), and (24) also set forth above, whereby "s" is an imaginary operator and $c_{Dy}$ is a torque moment constant.

Equation (24) illustrates a suitable function of the control circuit 52. This circuit is especially advantageous because the coefficient of the operators in the denominator are finite and these coefficients have a positive sine. Further, the stabilizing factors "i", "n" permit an advantageous damping adjustment relative to the respective axes.

In view of the above it will be appreciated that, for example, disturbances caused by wind gusts relative to the y-axis, will not influence the position of the gyro platform 13 which remains locked with the landing apparatus and the control as expressed by equation (24) will return the landing apparatus into the horizontal position ($\gamma_w \rightarrow \gamma_x = 0$).

When disturbances are effective about the x-axis and the z-axis a respective control circuit is effective in accordance with the equation (24) for maintaining the rated values, whereby equation (25) is applicable, namely $\xi_w = \eta_w = 0$. Adjustment motors relative to the axes x and z are not provided. Any deviations may be corrected by the control circuit through the steering nozzles 4. FIG. 11a illustrates the basic circuit arrangements for the position or attitude control system. The function of this system is evident in the light of the foregoing description. The steering nozzles 4 are supplied by a pressurized gas from the pressure gas container 6.

Figure 11B:
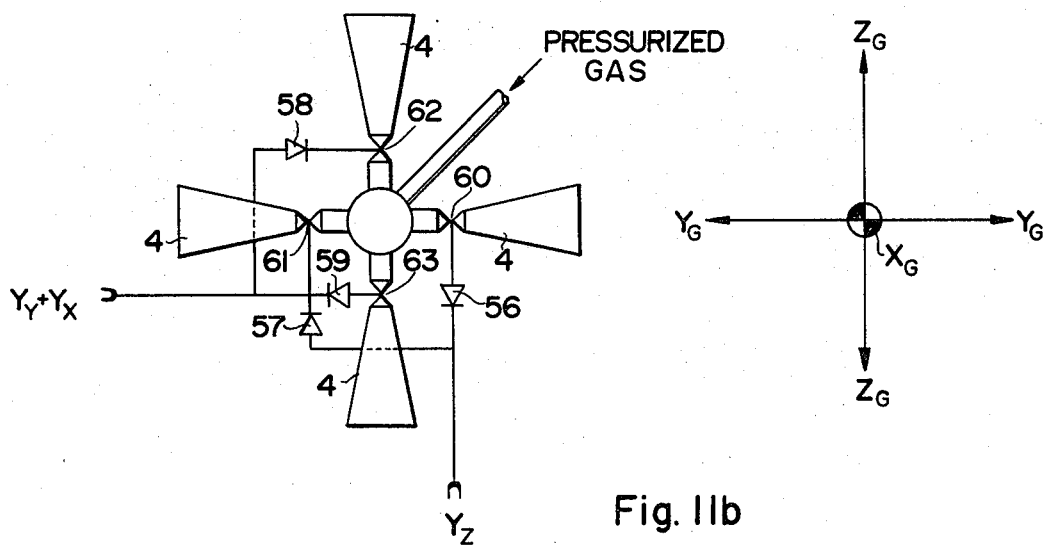
FIG. 11b shows a group of control nozzles of the position or attitude control.
Figure 11A:
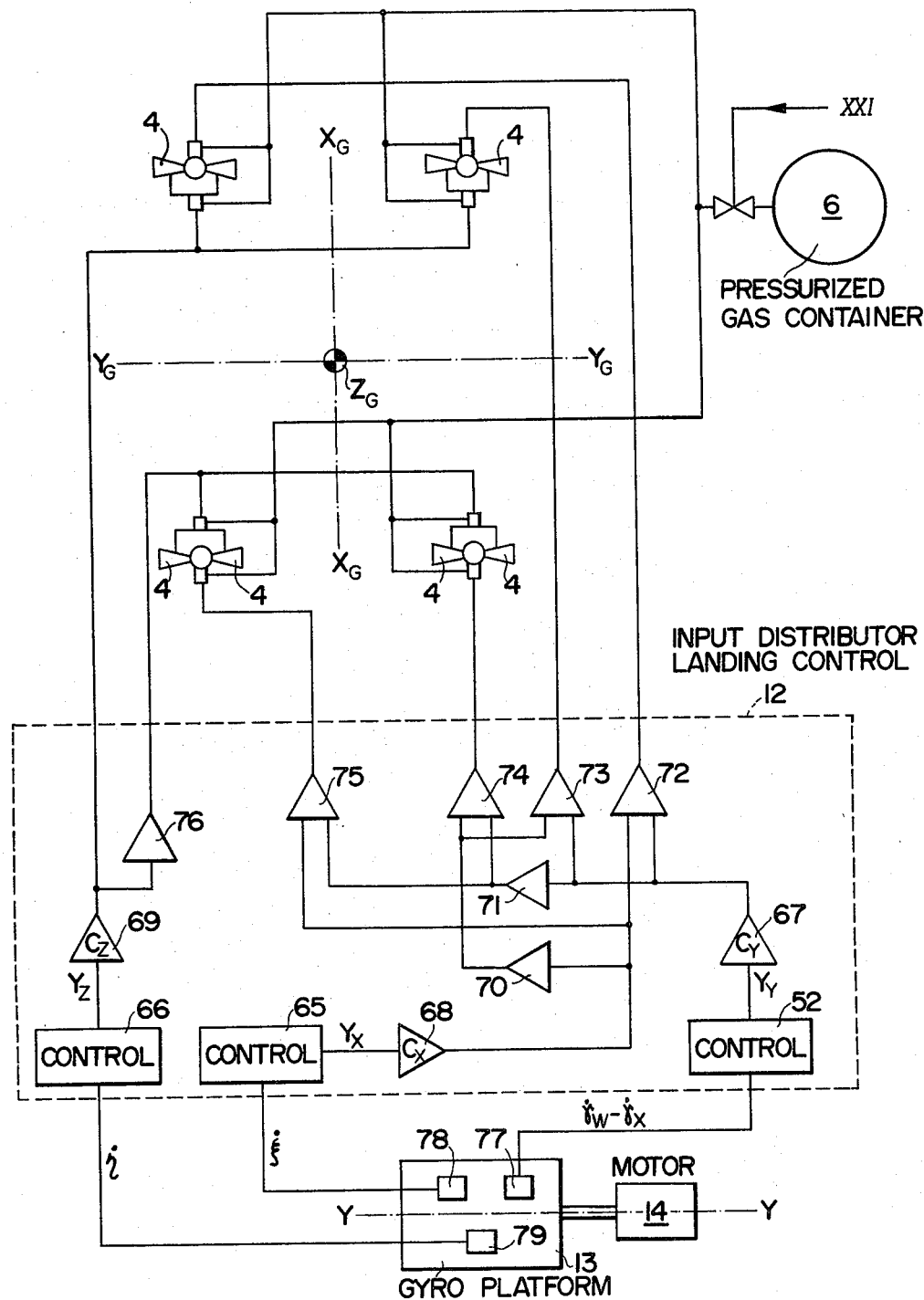
FIG. 11a is a block circuit diagram of a load position or attitude control system.

FIG. 11b shows a group of steering nozzles 4 which are operatively arranged at the bow and stern of the landing apparatus. Valves 60, 61, 62, and 63 permit the thrust control in such a manner that the individual thrusts are proportional to the respective adjustment values y. The diodes 56, 57, 58, and 59 make sure that the direction of the thrust is reversed when the control or adjustment values $y_x$, $Y_y$, and $y_z$ change their polarity or sine. The orientation of the nozzle or jet groups relative to the landing apparatus is provided by the coordinate axis system shown as part of FIG. 11b.

Figure 12:
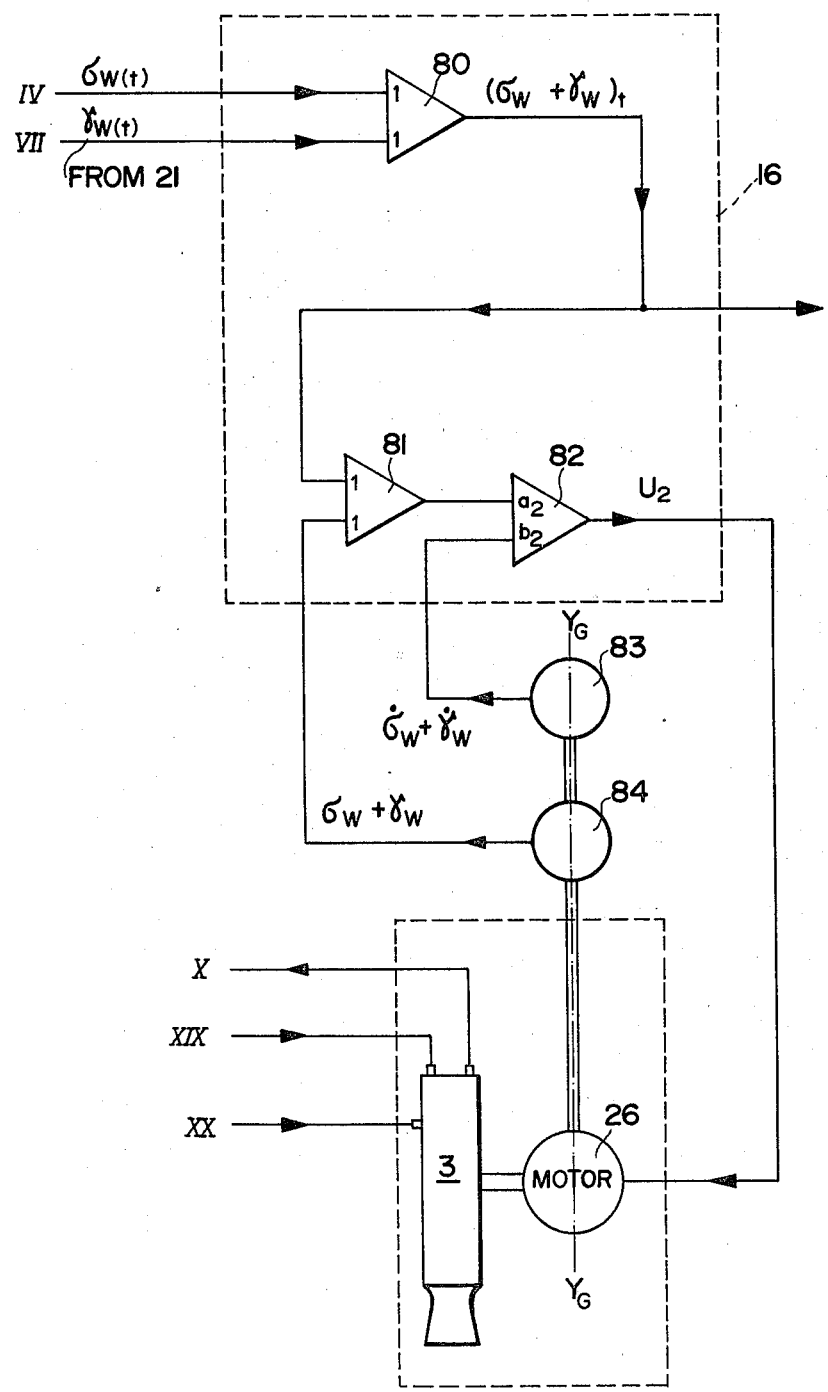
FIG. 12 illustrates a tilting drive mechanism including a mixing amplifier.

FIG. 12 shows a tilting drive mechanism for the rockets 3 including an adding amplifier 80, and two adding and mixing amplifiers 81 and 82. A tacho-generator 83 and an angle sensor 84 are arranged on the drive shaft of the motor 26. The mixing or adding amplifier 80 receives at its inputs from the terminal IV the signal $\sigma_w(t)$ and from the terminal VII the signal $\gamma_w(t)$, both provided by the landing program computer 21 carried by the landing apparatus. The construction and function for tilting the rockets 3 corresponds substantially to that of the respective circuit for rotating the gyro-platform 13 shown in FIG. 10b. The terminal 10 provides an identification signal designating the particular rocket type to the fail-safe logic circuit 23. The terminal IX provides the igniting or firing signal to the rocket 3 and the terminal XX provides a switch-off signal to the rocket 3 after the time $T_B$ has passed. This switch-off signal is supplied by the arithmetic unit 45.

FIG. 13 shows the fail-safe logic circuit 23 which makes sure that the starting or catapulting of the landing system may take place only when all components of the system have signified their readiness. The logic signal combination takes place substantially by means of AND-gates as shown. The input terminals of the failsafe logic circuit 23 receive the following signals:

terminal VI, landing program is stored and locked;
terminal 110, loading or discharge gates are open;
terminal 111, landing vehicle crew is ready;
terminal 112, signal supplied by the altimeter in FIG. 4;
terminal VIII, ready signal from onboard computer 44;
terminal 113, signal supplied by the speedometer of the aircraft;
terminal 114, signal supplied by arithmetic unit 44 according to FIG. 8; representing equation (1);
terminal 115, signal signifies that the catapult in the aircraft is ready;
terminal 116, the wheel r.p.m. is within permitted limits;
terminal X, the rocket type is identified according to a depression of key C in FIG. 7b;
terminal 117, the rocket type is identified according to control plug; and
terminal 118, signifies that the system is ready according to a check list.

Referring again to FIG. 13, if, for example, the adder 85 compares the altitude value determined from the angle $\theta$ of FIG. 4 provided by the altimeter with the value provided by the onboard computer, a difference may be formed. If the difference is within a permissible limit range, the adder 85 will provide a respective clear or ready signal to the AND-gate 90. The adder 86 will process the signals received at its input in the same manner to provide a respective clear or ready signal also to the AND-gate 90. The AND-gate 90 provides an output ready signal only if all six inputs to this gate simultaneously receive the respective clear or ready signal. The logic signal combining circuit comprises two additional AND-gates 89 and 91, the function of which is apparent from FIG. 13.

The signal amplifiers 87 and 88 amplify the signal level sufficiently for operation of the starter 22 and to energize signal indicators such as lights 92 and 93.

The starter 22 in turn provides a ready or indicator signal for the light 94 in the vehicle cockpit at the terminal XVII.

FIG. 14 illustrates the starter apparatus 22 including a portion 22a which is part of the carrier aircraft for operation by an operator in the aircraft and a part 22b which is a part of the landing apparatus. The airborne portion 22a of the starter comprises signal indicators such as lamps 95, 96, and 99, an amplifier 97, an AND-gate 98, and a starter button 100. These components are operatively interconnected as shown in FIG. 14. The starter part 22a receives on the terminal XVI a signal from the fail-safe logic circuit 23 significantly that the program, the rockets, and all systems components are clear and ready, whereby the lamp 96 lights up. Upon receipt at the terminal 15, of a further signal from the circuit 23 that all other parameters are ready or clear, the lamp 95 will light up. In this condition the landing system is ready to start. The starter button 100 is released for actuation by a signal from the circuit 23 at the terminal XIII. Only when this signal is present at the AND-gate 98, is it possible to depress the starter button 100 to release the starting signal, whereby the lamp 99 lights up to signify that the start is taking place. The lamp 94 in the cockpit of the vehicle forming part of the landing system lights up together with the lamp 99, please see FIG. 13. Thus, the crew in the vehicle is informed that the start is taking place. The start signal triggers the sequencing circuits of the starter part 22b which causes the following steps or operations: a starter catapult is operated at time $T_{00}$, the attitude or position control system is switched on at time $T_{01}$, the rockets are ignited at time $T_{02}$, and the frame structure is dropped at time $T_{0E}$. The frangible coupling means such as conventional plugs, are disconnected by the movement of the landing system out of or away from the carrier aircraft.

In the above listed equation (16) the expression $\dot{x}_{TA} = V_{Bx}^*$ corresponds to the preselected horizontal speed of the landing system near the ground. The vertical component of the speed which results without any thrust application during the catapulting of the landing system from the carrier aircraft after a free fall through the height or elevation $h_{oz}$ corresponding to FIG. 4 is reduced during the time set forth in equation 16b, namely, $T_B - T_A$. The influence of any lift may be disregarded in this context for all practical purposes.

FIG. 5 illustrates a summary of a realistic numerical example of the above described relationship. The inaccuracies which may result due to ignoring certain factors and due to statistic fluctuation, for example, in the thrust and in the air turbulence, are taken up by the damping system of the landing gear forming part of the landing vehicle. From the diagram shown in FIG. 5 one may conclude that there is hardly any time available for a reasonable intervention by the pilot either in the carrier aircraft or in the landing apparatus, into the descent procedure. Thus, the invention provides that the respective programs for the descent are stored in a memory. Any comparing values may include, for example, a measuring of the ejection height, for instance, by means of a radio altimeter ($\dot{x}, \theta$) and the angle of incidence of the apparatus as shown in FIG. 6. These features of the invention have the advantage that the landing craft does not require any personnel trained in the operation of landing the craft.

Incidentally, an angle of incidence $\alpha$ program may be calculated under the assumption: $\gamma_{xt} = 0$ and that no disturbances are effective, thus $$tg\,\alpha - w(t) = \left(\frac{\dot{z}}{\dot{x}}\right)_t$$

wherein $\dot{x}_t$ is obtained from equation (1) and wherein $\dot{Z}_t$ is obtained from equation (2).

FIG. 3 shows the substantial arrangement of the landing system according to the invention which reaches the ground with a preprogrammed horizontal speed so that it may start its intended mission without any delay.

Although the invention has been described with reference to specific example embodiments, it will be appreciated, that it is intended, to cover all modifications and equivalents within the scope of the appended claims.

What is claimed is:

1. A load landing system for discharging a load from an aircraft and landing said load on the ground, comprising frame means, means releasably securing said frame means to said load, rocket means operatively secured to said frame means, servomotor means operatively connected to said rocket means for tilting said rocket means, gyro platform means supported by said frame means, steering nozzle means supported by said frame means, closed loop control amplifier means operatively connecting said steering nozzle means to said gyro platform means for operating said steering nozzle means for the position control of the landing apparatus, computer means, keyboard input means operatively connected to said computer means for supplying input values to the computer means, said input values including values representing the horizontal starting speed of the load, the predetermined horizontal touchdown speed, and the mass of the load as it is starting from the aircraft, said computer providing output values including a tilting sequence for said rocket means, the operating duration of said rocket means and the dropping altitude above ground; said landing system further comprising logic circuit means operatively connected to the landing system for checking the landing system to provide clearance signals representing the operability of the landing system and given operating conditions, and pressure supply means operatively connected to said steering nozzle means.

2. The system of claim 1, wherein said rocket means comprise two solid fuel rockets.

3. The system of claim 1, wherein said computer means guide the landing system on a predetermined descent trajectory to land the system with substantially zero vertical velocity and with preselected horizontal velocity without any human corrective efforts.

4. The system of claim 1, wherein said computer means provide a constant angular speed for the tilting of said rocket means.

5. The system of claim 1, wherein said rocket means have a constant thrust during descent.

6. The system of claim 1, wherein said rocket means comprise two rocket engines each developing the same thrust, each rocket engine further comprising tilting means for tiltably securing the respective rocket engine to said frame means, said tilting means having a variable tilting angle, said computer means further comprising means controlling the tilting duration, whereby different descending programs may be performed by varying the tilting angle and the tilting duration.

7. The system of claim 1, wherein said steering nozzle means comprise gas jet means operatively arranged for stabilizing the position of the system.

8. The system of claim 7, further comprising incidence angle sensing means operatively connected for controlling the position of said gas jet means to maintain a certain aerodynamic angle of incidence, especially such an angle of incidence that a minimum lift is maintained.

9. The system of claim 1, wherein said frame means are constructed for attachment to a vehicle to be landed.

10. The system of claim 9, wherein said frame means comprise frame members adapted to be blown off said vehicle.

11. The system of claim 1, wherein said frame means constitutes an integral structural component of a load to be landed, especially a vehicle capable of cross country travel.

12. The system of claim 1, further comprising force take-up means operatively arranged to transmit to the apparatus a catapult motion.

13. The system of claim 1, wherein said steering nozzle means comprise a plurality of pressure gas jet means each of which comprises four nozzle members.

* * * * *